(12) United States Patent
Lind et al.

(10) Patent No.: US 8,374,835 B2
(45) Date of Patent: Feb. 12, 2013

(54) METHOD AND APPARATUS TO IMPROVE DESIGN, MANUFACTURE, PERFORMANCE AND/OR USE OF WELL TOOLS

(75) Inventors: William H. Lind, Magnolia, TX (US); Kevin L. Glass, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 12/745,671

(22) PCT Filed: Nov. 26, 2008

(86) PCT No.: PCT/US2008/084783
§ 371 (c)(1),
(2), (4) Date: Jun. 1, 2010

(87) PCT Pub. No.: WO2009/073495
PCT Pub. Date: Jun. 11, 2009

(65) Prior Publication Data
US 2010/0312370 A1    Dec. 9, 2010

Related U.S. Application Data

(60) Provisional application No. 60/992,392, filed on Dec. 5, 2007.

(51) Int. Cl.
*G06G 7/48* (2006.01)
(52) U.S. Cl. .......................................................... 703/7

(58) Field of Classification Search ....................... 703/7
See application file for complete search history.

(56) References Cited

U.S. PATENT DOCUMENTS

| 5,552,992 A | 9/1996 | Hunter ..................... 364/468.25 |
|---|---|---|
| 2004/0068338 A1 | 4/2004 | Macy et al. ..................... 700/98 |
| 2006/0074616 A1 | 4/2006 | Chen .............................. 703/10 |
| 2007/0067147 A1 | 3/2007 | Huang ............................. 703/7 |

OTHER PUBLICATIONS

International Search Report and Written Opinion; PCT/US2008/084783; pp. 11, Jan. 26, 2009.
International Preliminary Report on Patentability, International Application No. PCT/US08/84783, 13 pgs, Jul. 13, 2011.

*Primary Examiner* — Hugh Jones
(74) *Attorney, Agent, or Firm* — Baker Botts L.L.P.

(57) ABSTRACT

Methods and systems are provided to improve design, manufacture and performance of oilfield equipment and well tools using three dimensional (3D) scanning technology and one or more feedback loops. Manufacturing processes and techniques associated with a well tool may be evaluated based on comparing "as built" 3D data with a design data file for the well tool. Based on differences between "as built" 3D data and the design data file, one or more changes in associated manufacturing procedures and/or technique may be made. Computational fluid dynamic applications may be used to simulate fluid flow characteristics of a well tool using associated design data file, "as built" 3D data and/or after use 3D data. The associated design data file, manufacturing procedures and/or procedures for use of the well tool may be modified based on comparing simulated fluid flow data with desired fluid flow characteristics for the well tool.

21 Claims, 4 Drawing Sheets

METHOD AND APPARATUS TO IMPROVE DESIGN, MANUFACTURE, PERFORMANCE AND/OR USE OF WELL TOOLS

CROSS REFERENCE TO RELATED APPLICATIONS

This application is a U.S. National Stage Application of International Application No. PCT/US2008/084783 filed Nov. 26, 2008, which designates the United States and claims the benefit of U.S. Provisional Patent Application Ser. No. 60/992,392, filed Dec. 5, 2007, the contents of which are hereby incorporated in their entirety by reference.

TECHNICAL FIELD

The present disclosure is related to apparatus and methods which may be used to improve design, manufacture, performance and/or use of well tools and more particularly to digital scanning of both new well tools and used well tools to improve associated designs, manufacturing procedures and/or operating procedures to achieve performance objectives for each well tool.

BACKGROUND OF THE DISCLOSURE

Various types of three dimensional (3D) measuring systems and scanning systems have been used to measure and record detailed design parameters associated with a wide variety of products and processes in various digital formats. Three dimensional (3D) scanners may generally be described as contact scanners, laser scanners and/or light scanners.

3D contact scanners typically use a respective probe to determine coordinates of various points on exterior and/or interior surfaces of a work piece. 3D contact scanners may sometimes be referred to as coordinate measuring machines (CMM). CMM machines or contact measuring systems may move an associated measuring probe to determine coordinates of multiple points on interior and/or exterior surfaces of a work piece. An associated computer and computer programs may be used to create a 3D image of the work piece based on respective coordinates of the multiple points.

3D laser scanners or 3D light scanners may use laser beams or other types of light beams projected against exterior and/or interior surfaces of a work piece. Many thousands of points may be recorded and used to determine size and position of each point and to prepare a detailed 3D image of the work piece.

Commercially available 3D scanners may produce very accurate and precise 3D data files of complex 3D objects or work pieces. Such 3D scanners may be fully integrated with associated computer aided engineering (CAE) or computer aided design (CAD) applications and may provide comprehensive measurements in an associated 3D coordinate system. Such 3D scanners may gather highly accurate and detailed digital data for quality control purposes, reverse engineering, rapid prototyping, rapid machining and/or digital mock-ups.

SUMMARY OF THE DISCLOSURE

In accordance with teachings of the present disclosure, three dimensional (3D) scanning technology and one or more feedback loops may be used to improve design, manufacture and/or performance of a wide variety of oilfield tools and/or well tools. One aspect of the present disclosure may include combining 3D scanning technology with a plurality of feedback loops which may be used to improve design, manufacture, performance and/or use of rotary drill bits and other oilfield tools or well tools. Teachings of the present disclosure may be used to eliminate or reduce manufacturing errors and/or improper use of oilfield tools or well tools. 3D scanning technologies and one or more feedback loops incorporating teachings of the present disclosure may be used to improve procedures associated with design, manufacture and/or use of oilfield equipment and/or well tools.

For some applications a well tool may be digitally scanned after initial manufacture. A resulting 3D image may be used to create an "as built" 3D data file. The as built 3D data file may be compared with a corresponding design data file or a corresponding 3D design data file including, but not limited to, engineering drawings, manufacturing drawings, manufacturing procedures and associated specifications. Any difference or differences between the "as built" 3D data and the design data file may be used to evaluate performance of one or more manufacturing techniques and procedures to produce a work piece or well tool corresponding with the design data file.

Used well tools may also be digitally scanned in accordance with teachings of the present disclosure to create an "after use" 3D data file. Comparisons between a respective design data file and an associated after use 3D data file may be used to evaluate performance of such well tools after use at a field location or well site. Comparisons between respective design data files, as built 3D data files and/or after use 3D data files may be used to improve associated design, manufacturing, and/or operating procedures associated with such well tools.

For some embodiments multiple feedback loops may be used to improve associated design of a well tool, manufacturing techniques and procedures associated with the well tool and/or procedures associated with use of the well tool at a field location or well site. For example, evaluating as built dimensions and configurations of a well tool may be used to improve associated manufacturing techniques and procedures and/or may be used to modify an associated design data file to allow improved manufacturing efficiency and to reduce manufacturing costs. For other applications detailed dimensions and configurations taken from a used well tool may be used to improve an associated design data file, associated manufacturing procedures and techniques and/or procedures associated with use of the well tool at a field location or well site.

Using 3D scanning techniques and other teachings of the present disclosure, a design data file, associated as built data file and associated after use data file may be compared with each other. The resulting comparisons may be used to select various materials and alloys for manufacturing a well tool. Such material selections may be made to achieve desired performance objectives for the well tool.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE DISCLOSURE

Figure 1:
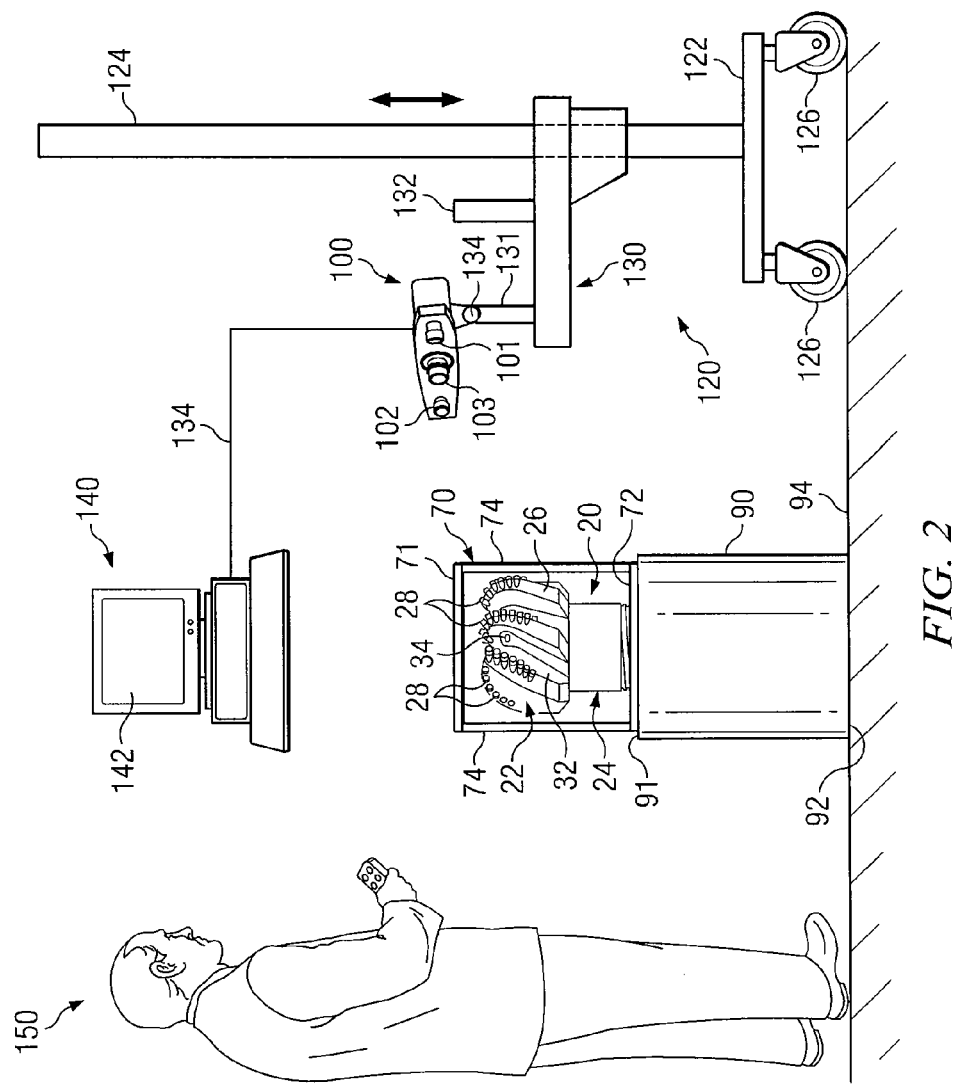
FIG. 1 is a schematic drawing in elevation showing one example of a well tool disposed within an open cage in accordance with teachings of the present disclosure.

Preferred embodiments of the disclosure and its advantages are best understood by reference to FIGS. 1-5 wherein like number refer to same and like parts.

The term "bottom hole assembly" or "BHA" be used in this application to describe various components and assemblies disposed proximate a rotary drill bit at a downhole end (not expressly shown) of a drill string (not expressly shown). Examples of components and assemblies (not expressly shown) which may be included in a bottom hole assembly or BHA include, but are not limited to, a bent sub, a downhole drilling motor, a near bit reamer, stabilizers and downhole instruments. A bottom hole assembly may also include various types of well logging tools (not expressly shown) and other downhole tools associated with directional drilling of a wellbore. Examples of such logging tools and/or directional drilling tools may include, but are not limited to, acoustic, neutron, gamma ray, density, photoelectric, nuclear magnetic resonance, rotary steering tools and/or any other commercially available well tool.

The terms "cutting element" and "cutting elements" may be used in this application to include, but are not limited to, various types of cutters, compacts, buttons, inserts and gage cutters satisfactory for use with a wide variety of rotary drill bits. Impact arrestors may be included as part of a cutting structure on some types of rotary drill bits and may sometimes function as cutting elements to remove formation materials from adjacent portions of a wellbore. Polycrystalline diamond compacts (PDC) and tungsten carbide inserts are often used to form cutting elements. Various types of other hard, abrasive materials may also be satisfactorily used to form cutting elements.

The term "cutting structure" may be used in this application to include various combinations and arrangements of cutting elements, impact arrestors and/or gage cutters formed on exterior portions of a rotary drill bit. Some rotary drill bits may include one or more blades extending from an associated bit body with cutters disposed of the blades. Such blades may also be referred to as "cutter blades". Various configurations of blades and cutters may be used to form cutting structures for a rotary drill bit.

The term "design data file" may include, but is not limited to, data from engineering drawings, manufacturing drawings, manufacturing procedures, associated specifications and tolerances. A design data file may also include applicable industry standards. A design data file may be maintained in a wide variety of formats.

The term "3D design data file" may be used in this application to include a design data file maintained in a three dimensional format.

A wide variety of commercially available software packages such as, but not limited to, computer aided engineering (CAE) programs, computer aided design (CAD) programs, and/or computer aided manufacturing (CAM) may be used to prepare a three dimensional (3D) design data file corresponding with an initial design data file. Such software applications may also be used to make various improvements to the initial (3D) design data file in accordance with the teachings of the present disclosure. Such software applications may also be used to convert a scanned 3D image of a well tool into a corresponding 3D data file. Commercially available computational fluid dynamics (CFD) software programs, packages and/or applications and finite element analysis (FEA) software programs, packages and/or applications may also be used to carry out various teachings of the present disclosure.

CAE, CAD and/or CAM applications often call for specific type tooling, fixtures and/or molds to assist with manufacture and assembly of associated well tools and oilfield equipment. One or more feedback loops incorporating teachings of the present disclosure may be used to validate that such tooling, fixtures and/or molds perform satisfactorily to produce work pieces having desired dimensions and configurations. The performance of such tooling, fixtures and/or molds may be periodically checked using 3D scanning techniques and feedback loops incorporating teachings of the present disclosure to ensure that associated tooling, fixturing and/or mold continue to perform satisfactorily and have not been damaged or are out of tolerance. For example a mold associated with forming a matrix bit body may periodically be scanned and compared with an associated design data file. Based on comparison between the associated design data file and a current as built 3D data file the mold may be scrapped, reworked, associated design data file modified, and/or associated molding procedures modified.

The terms "performance requirements" and "performance objectives" may include, but are not limited to, useful life of an oilfield tool or a well tool in an appropriate operating environment or drilling environment. One example of a performance objective may be downhole drilling life of a rotary drill bit. Performance objectives for rotary drill bits may be defined with respect to rate of penetration through various types of downhole formations for respective periods of time prior to requiring replacement of the rotary drill bit. Revolutions per minute (RPM) and/or weight on bit (WOB) may also be used to define performance objectives for a rotary drill bit. Performance objectives of a well tool incorporating teachings of the present disclosure may also be described with respect to manufacturing costs and/or operating costs associated with the well tool.

For purposes of describing various features and steps of the present disclosure, the terms "well tool" and "well tools" may be used to describe a wide variety of oilfield equipment (both surface and subsurface), well drilling equipment, well drilling tools, well completion equipment, well completion tools, well service tools, well service equipment, and/or associated components which may be designed, manufactured and/or used based at least in part on 3D scanning techniques and feedback loops in accordance with teachings of the present disclosure.

Examples of such well tools and/or associated components (not expressly shown) may include, but are not limited to, rotary drill bits, fixed cutter drill bits, rotary drill bits, various components of a bottom hole assembly, bit bodies associated with a wide variety of rotary drill bits, drill string stabilizers, cones for roller cone drill bits, rotary steering tools, logging while drilling tools, measurement while drilling tools, side wall coring tools, fishing spears, washover tools, whipstocks, production packer components, float equipment, casing shoes, casing shoes with cutting structures, well screen bodies and connectors, gas lift mandrels, downhole tractors for pulling coiled tubing, tool joints, wired (electrical and/or fiber optic) tool joints, well screens, rotors, stator and/or housings for downhole motors, blades and/or housings for downhole turbines, latches for downhole tools, downhole wireline service tools and other downhole tools with complex configurations and/or geometries associated with competing a wellbore and molds associated with manufacture of such well tools and/or components.

The term "rotary drill bit" may be used in this application to include various types of fixed cutter drill bits, drag bits, matrix drill bits, steel body drill bits, roller cone drill bits, rotary cone drill bits and rock bits operable to form a wellbore extending through one or more downhole formations. Rotary drill bits and associated components incorporating teachings of the present disclosure may have many different designs, configurations and/or dimensions.

Molds used to form elastomeric and/or rubber components for such well tools may be designed, manufactured and/or used based at least in part on 3D scanning techniques and feedback loops incorporating teachings of the present disclosure. Molds for bit bodies and forging dyes used to fabricate various components such as, but not limited to, support arms for roller cone drill bits, arms for fixed reamers, arms for expandable reamers, internal components associated with expandable reamers may be designed, manufactured and/or used based at least in part on 3D scanning techniques and feedback loops incorporating teachings of the present disclosure.

Figure 2:
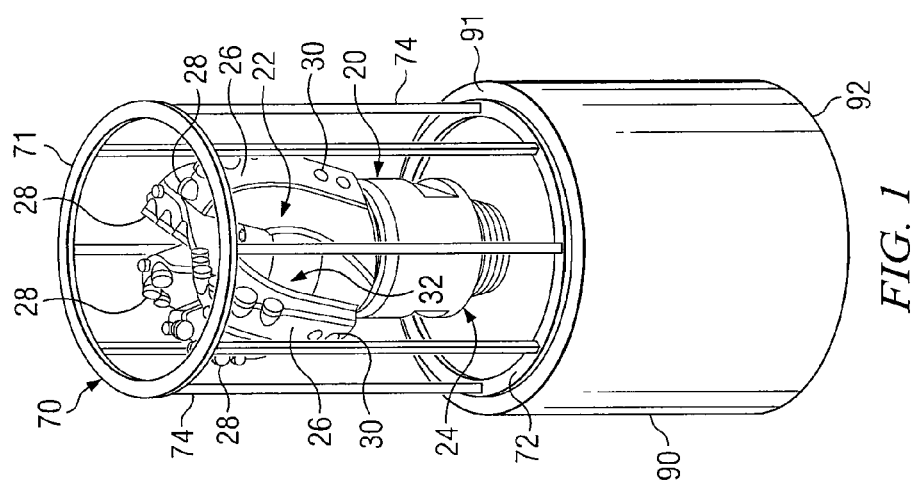
FIG. 2 is a schematic drawing in elevation with portions broken away showing one example of a system which may be used to scan and record detailed dimensions and configurations of a well tool in accordance with teachings of the present disclosure.

Three dimensional (3D) scanning devices, equipment and/or systems may be used to provide highly detailed digital representations of complex 3D objects including, but not limited to, rotary drill bit 20 as shown in FIGS. 1 and 2 and a wide variety of other well tools. Teachings of the present disclosure are not limited to rotary drill bit 20.

3D scanning devices, equipment and/or systems which may be used to improve design, manufacture, performance and/or use of well tools in accordance with teachings of the present disclosure may be obtained from Capture 3D, Incorporated, a California corporation located at 3505 Cadillac Avenue, Costa Mesa, California 92626. 3D scanning system 100 may be an ATOS 3D scanning system or measuring system from Capture 3D and may be used to improve design, manufacture, performance and/or use of a wide variety of well tools in accordance with teachings of the present disclosure. 3D scanning devices, equipment and/or systems from other companies may also be satisfactorily used to carry out various teachings of the present disclosure. Teachings of the present disclosure are not limited to 3D scanning system 100.

ATOS 3D scanning systems may be generally described as flexible, optical measuring equipment operable to provide detailed digital data corresponding with the dimensions and configuration of complex objects or work pieces. White light may be projected onto such complex objects or work pieces. Resulting fringe patterns from the projected white light may be observed or scanned by at least two cameras. Some 3D scanning systems may use one or more laser beams. Teachings of the present disclosure are not limited to white light 3D scanning systems.

For some applications exterior portions of a work piece may be coated with a thin layer of developer powder or film to prevent undesired reflections from any shiny metal surfaces on the well tool. The various types of commercially available developer powder and/or films may be satisfactorily used.

Based on principles of triangulation, 3D coordinates for each camera pixel may be used to calculate a detailed 3D polygon mesh of a scanned object or work piece with high precision. Even objects or work pieces with complex configurations and dimensions may be scanned with high precision. 3D digital information from an ATOS 3D scanning system may provide detailed digital data for a wide variety of objects, work pieces and associated surfaces.

FIG. 1 is a schematic drawing showing an isometric view of a well tool disposed on a stand in preparation for scanning of the well tool using a three dimensional (3D) scanning system in accordance with teachings of the present disclosure. For some applications a well tool such as rotary drill bit 20 may be disposed on first end 91 of stand 90 as shown in FIGS. 1 and 2. Second end 92 of stand 90 may be disposed on floor 94 or any other appropriate surface. Stand 90 may be described as having a generally cylindrical configuration. However, stands having a wide variety of other configurations may also be satisfactorily used with a 3D scanning system in accordance with teachings of the present disclosure. Teachings of the present disclosure are not limited to use with stand 90.

Rotary drill bit 20 may include bit body 22 with metal shank 24 extending therefrom. Metal shank 24 may be used to releasably engage drill bit 20 with one end of a drill string or bottom hole assembly (not expressly shown). Rotary drill bit 20 may include a plurality of blades 26 extending radially outward from bit body 22. A plurality of cutting elements or cutters 28 may be disposed on each blade 26. Cutting elements 28 may engage adjacent portions of a downhole formation to form a wellbore (not expressly shown). One or more gage cutters 30 may also be disposed on exterior portions of each blade 26.

Fluid flow paths or junk slots 32 may be formed on exterior portions of bit body 22 between adjacent blades 26. One or more nozzles 34 may be also disposed within bit body 22. Nozzles 34 may be used to direct drilling fluid from an associated drill string to exit from bit body 22 proximate exterior portions of blades 26 and cutting elements 28. A mixture of drilling fluid, formation cuttings and other downhole debris (not expressly shown) may flow from the end of a wellbore formed by rotary drill bit 20 upwardly through associated fluid flow paths or junk slots 32 to an associated well surface.

For some embodiments reference points or small dots may be placed on exterior portions of a well tool. The reference points or small dots may be used by an associated 3D scanning system to produce a detailed 3D image corresponding with associated dimensions and configurations of the well tool. For other embodiments various reference tools or reference devices may be used in combination with a 3D scanning system to produce a detailed 3D image corresponding with associated dimensions and configurations of a well tool.

For embodiments such as shown in FIGS. 1 and 2, cage or reference device 70 may be disposed on first end 91 of stand 90 surrounding rotary drill bit 20. Cage or reference device 70 may be described as having a generally hollow, cylindrical configuration defined in part by first end or first ring 71 and second end or second ring 72. A plurality of relatively thin struts or stringers 74 may be disposed between first ring 71 and second ring 72. Each strut or stringer 74 may be spaced an optimum distance relative to adjacent struts or stringers 74 to minimize interference with 3D scanning of a well tool disposed therein.

A plurality of dots or reference points 76 may be disposed on various portions of reference device 70. See FIG. 3A. Placing dots or reference points 76 on reference device 70 eliminates time required to place similar dots or reference points on each well tool prior to scanning with 3D scanning system 100.

3D scanning system 100 as shown in FIG. 2 may be disposed on movable support assembly 120. Movable support assembly 120 may include platform 122 with post 124 extending therefrom. A plurality of wheels 126 may be disposed on platform 122 opposite from post 124. Wheels 126 allow positioning stand 120 at any desired location relative to stand 90 and a well tool disposed thereon. Supporting arm or tray 130 may be slidably disposed on post 124. Supporting arm 130 may be raised or lowered to vary the location of 3D scanning system 100 relative to stand 90 and a well tool disposed thereon.

Supporting arm or tray 130 may include first location 131 and second location 132 for attachment of 3D scanning system 100 thereto. Depending upon dimensions and/or configuration of an associated well tool, 3D scanning system 100 may sometimes be placed at first location 131 or second location 132.

One of the benefits of the present disclosure may include the ability to position support assembly 120 at various locations relative to stand 90. Supporting arm 130 may also be raised and lowered relative to stand 90 and a well tool disposed thereon. The location of 3D scanning system 100 may be varied between first location 131 and second location 132. For some applications, reference device 70 may be rotated or moved relative to rotary drill bit 20 or any other well tool disposed therein.

3D scanning system 100 may be placed at an optimum location relative to a well tool disposed on stand 90 and/or reference tool 70 may be moved relative a well tool disposed on stand 90, to accommodate substantially full 3D scanning of all exterior portions of the well tool, including, but not limited, fixed cutter rotary drill bits and roller cone drill bits (not expressly shown). At the beginning of each scanning process and after any movement of reference tool 70, stand 90, well tool 20 and/or 3D scanning system 100, 3D scanning system 100 may be calibrated or recalibrated as appropriate. Any movement of movable support assembly 120 may also require calibration or recalibration of 3D scanning system 100.

For embodiments such as shown in FIG. 2, 3D scanning system 100 may include first camera or positioning camera 101 and second camera or positioning camera 102. Third camera or light source 103 may be disposed between first camera 101 and second camera 102. White light from third camera 103 may be reflected from reference points 76 and various portions of a well tool disposed on stand 90. Placing reference points 76 on cage 70 avoids the need to place such reference points on the well tool. As a result, multiple well tools may be measured using the same reference tool 70. Reference points or dots 76 provide required references for 3D scanning of a well tool disposed therein to produce detailed three dimensional data corresponding with dimensions and configuration of the well tool.

3D scanning system 100 may be connected by cable 134 or may be connected wirelessly (not expressly shown) with various types of computing systems or computer networks. For embodiments such as shown in FIG. 2, general purpose computer 140 may be connected by one or more cables 134 with 3D scanning system 100. General purpose computer 140 may also be one component of a larger computer network (not expressly shown).

Computer display or computer monitor 142 may be used to visually show the status of scanning a well tool disposed on stand 90 and to visually display results of such scanning. Computer 140 and monitor 142 allow operator 150 to ensure satisfactory scanning of well tool 20. For example, an image of well tool 20 may be displayed on monitor 142 in a first color or no color prior to scanning. As various portions of well tool 20 are scanned, the color may be changed to red or any other suitable color. If the well tool is initially shown without color prior to scanning, scanned portions may be shown in a related color such as red or green after sufficient data has been collected to create an associated 3D image of the scanned portion.

Operator 150 may position support assembly 120 at various locations relative to stand 90 to accommodate full scanning of all desired portions of well tool 20. Operator 150 may also rotate or change the position of referenced device 70 relative to well tool 20 to ensure that all portions of well tool 20 are exposed to 3D scanning system 100. For some applications, operator 150 may change the location of support assembly 120 relative to stand 90, change the orientation of scanning system 100 relative to position 131 or position 132 and also rotate or change the relationship of reference device 70 relative to well tool 20 to ensure complete, satisfactory 3D scanning thereof.

Figure 3A:
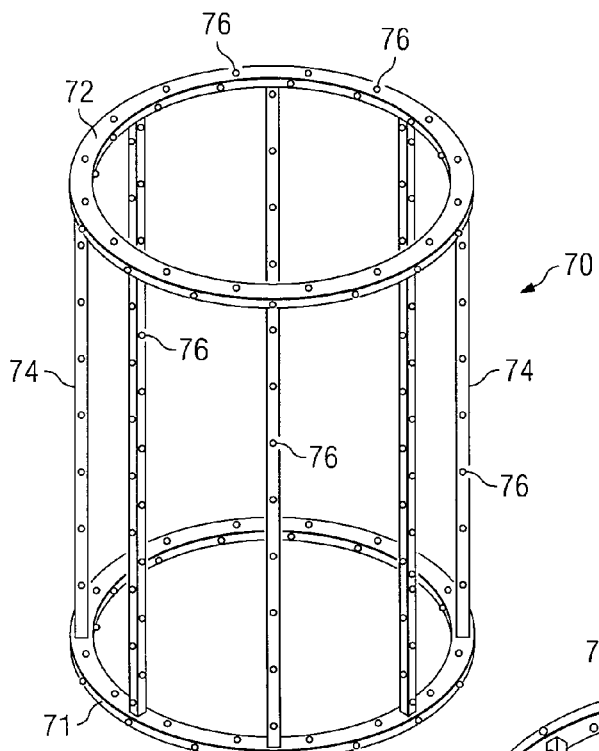
FIG. 3A is a schematic drawing in section showing one example of an open cage which used to scan and digitally record detailed dimensions and configurations of a well tool in accordance with teachings of the present disclosure.
Figure 3B:
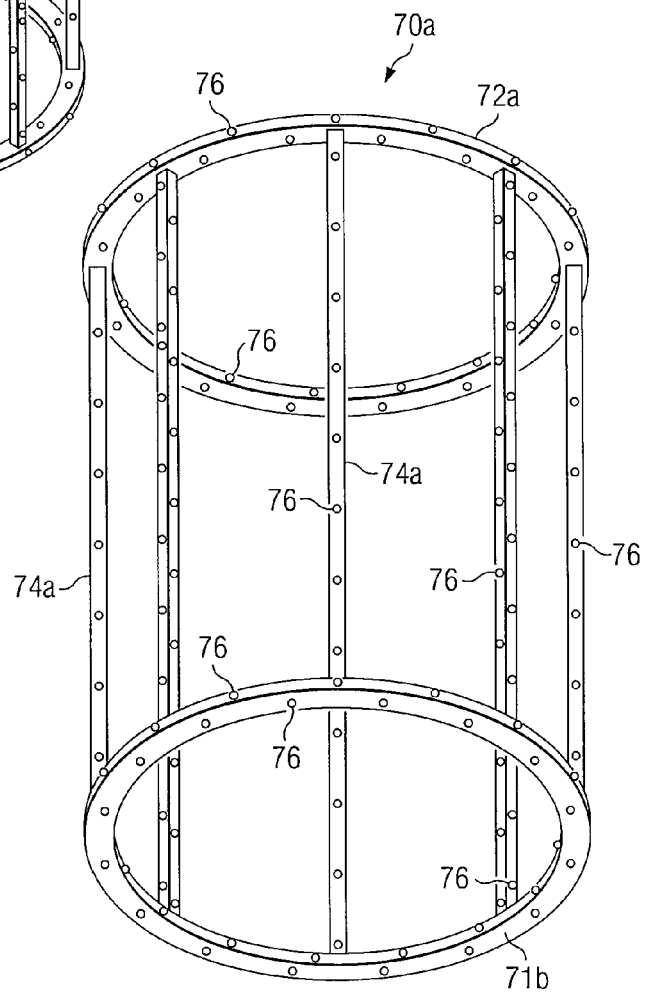
FIG. 3B is a schematic drawing in elevation showing another example of an open cage incorporating teachings of the present disclosure.

For embodiments such as shown in FIGS. 1 and 2, the dimensions and configuration of reference device 70 may be selected to be generally compatible with corresponding dimensions and configurations of a well tool such as rotary drill bit 20. FIG. 3A shows reference device 70 satisfactory for use with rotary drill bit 20. FIG. 3B shows reference tool 70a having a similar configuration with larger dimensions as compared to reference tool 70. Reference tool 70a may be appropriate for use with a well tool having dimensions larger than rotary drill bit 20.

Using a reference tool having a size corresponding generally with the size of a well tool disposed therein may allow 3D scanning system 100 to record more reference points while scanning adjacent portions of a well tool disposed therein. Optimizing the number of reference point 76 disposed on a reference tool and the size of a reference tool will generally reduce the amount of time required to scan and obtain a satisfactory 3D image of a well tool disposed within the reference tool. Increasing the number of reference points disposed on a reference tool may generally reduce scanning time required to obtain a satisfactory 3D image.

For some applications, reference device 70 may accommodate scanning a well tool with an accuracy of approximately four thousandths of an inch (0.004 in.). Reference tool 70a may accommodate 3D scanning of well tools with an accuracy of approximately seven thousandths of an inch (0.007 in.). One of the features of the present disclosure may include using a reference tool having an optimum size relative to a well tool which may be disposed within the reference tool and scanned using a 3D scanning system.

For some applications 3D scanning system 100 may produce a 3D image of rotary drill bit 20. The 3D image of rotary drill bit 20 may be transferred to general purpose computer 140 and/or a computer network attached to general purposed computer 140. Computer 140 and/or an associated computer network may convert the 3D image of rotary drill bit 20 into an associated 3D data file.

For some applications a well tool may be placed on stand 90 following completion of manufacturing and the well tool prior to use at a well site. For such applications the resulting 3D data file may be referred to as an "as built" 3D data file. For other applications a well tool may be placed on stand 90 after use at a well site. The resulting 3D data file may sometimes be referred to as an "after use" 3D data file.

Used rotary drill bits may sometimes be referred to as dull bits. For used rotary drill bits the resulting after use 3D data file may also be referred to as a "dull bit" 3D data file. Comparisons may be performed between a dull bit 3D data file and an associated as built 3D data file. Such comparisons may be used to quantify, often in a digital format, specific amounts of abrasion, erosion and/or wear of associated cutting structures and cutting elements. One or more conversion tables may be used to translate quantified amounts of abrasion, erosion and/or wear into corresponding IADC Drill Bit Grading. For example an IADC Drill Bit Grade of zero (0) for a used fixed cutter rotary drill bit corresponds with substantially no lost, worn and/or broken cutting structure. An IADC Drill Bit Grade of eight (8) for a used fixed cutter rotary drill bit corresponds with substantially 100% of the associated cutting structure lost, worn and/or broken. Additional information about drill bit grading is available from the International Association of Drilling Contractors (IADC).

Computer 140 and/or an associated computer network may convert each 3D image (as built and after use) into a complex polygon mesh corresponding with the dimensions and configurations of rotary drill bit 20 as built or after use. Computer 140 and/or an associated computer network may be operable to store 3D design data files, as built 3D data files and after use 3D data files associated with rotary drill bit 20 and/or a wide variety of other well tools. The respective 3D data files (design, as built and after use), may be used in accordance with teachings of the present disclosure to improve design, manufacture, performance and/or use of rotary drill bit 20 and/or a wide variety of other well tools.

One of the features of the present disclosure may include providing multiple feedback loops during design, manufacture and/or use of a well tool to improve performance of the well tool relative to one or more performance objectives or performance requirements. Teachings of the present disclosure may also be used to improve the performance of both manufacturing procedures and/or manufacturing equipment including, but not limited to, molds, dies, fixtures and other type of tooling. Each manufacturing process and each piece of manufacturing equipment may also be evaluated and improved in accordance with teachings of the present disclosure. For example hard facing applied on exterior portions of rotary drill bit 20 may be evaluated on a welder by welder basis. An evaluation of thickness or quality of a layer of hardfacing (not expressly shown) may be made based on comparison of an as built 3D data with a corresponding 3D design data file in accordance with teachings of the present disclosure.

Figure 4:
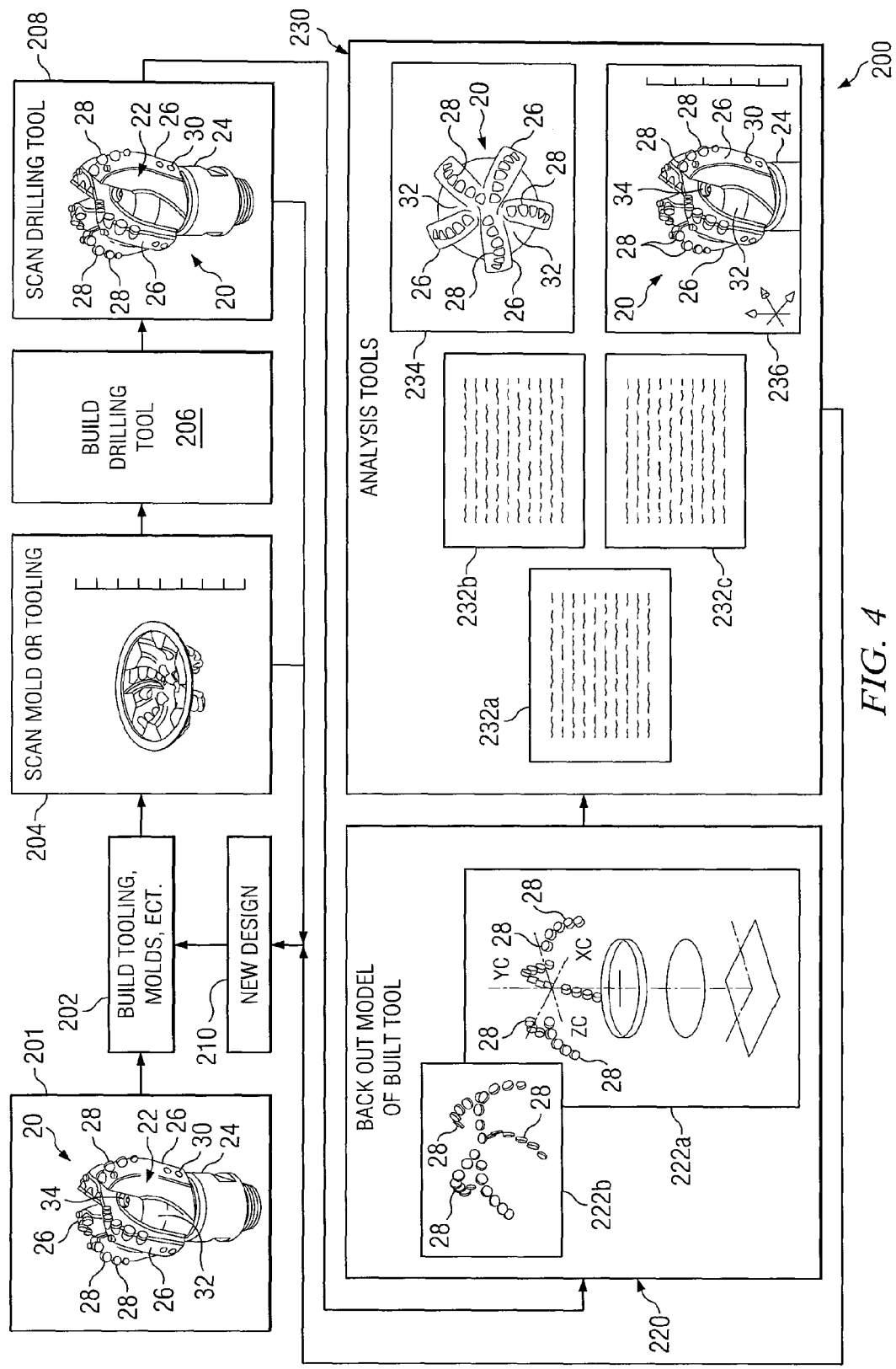
FIG. 4 is a schematic drawing showing various steps associated with one example of scanning a well tool and modifying an associated design file and/or manufacturing procedures in accordance with teachings of the present disclosure.
Figure 5:
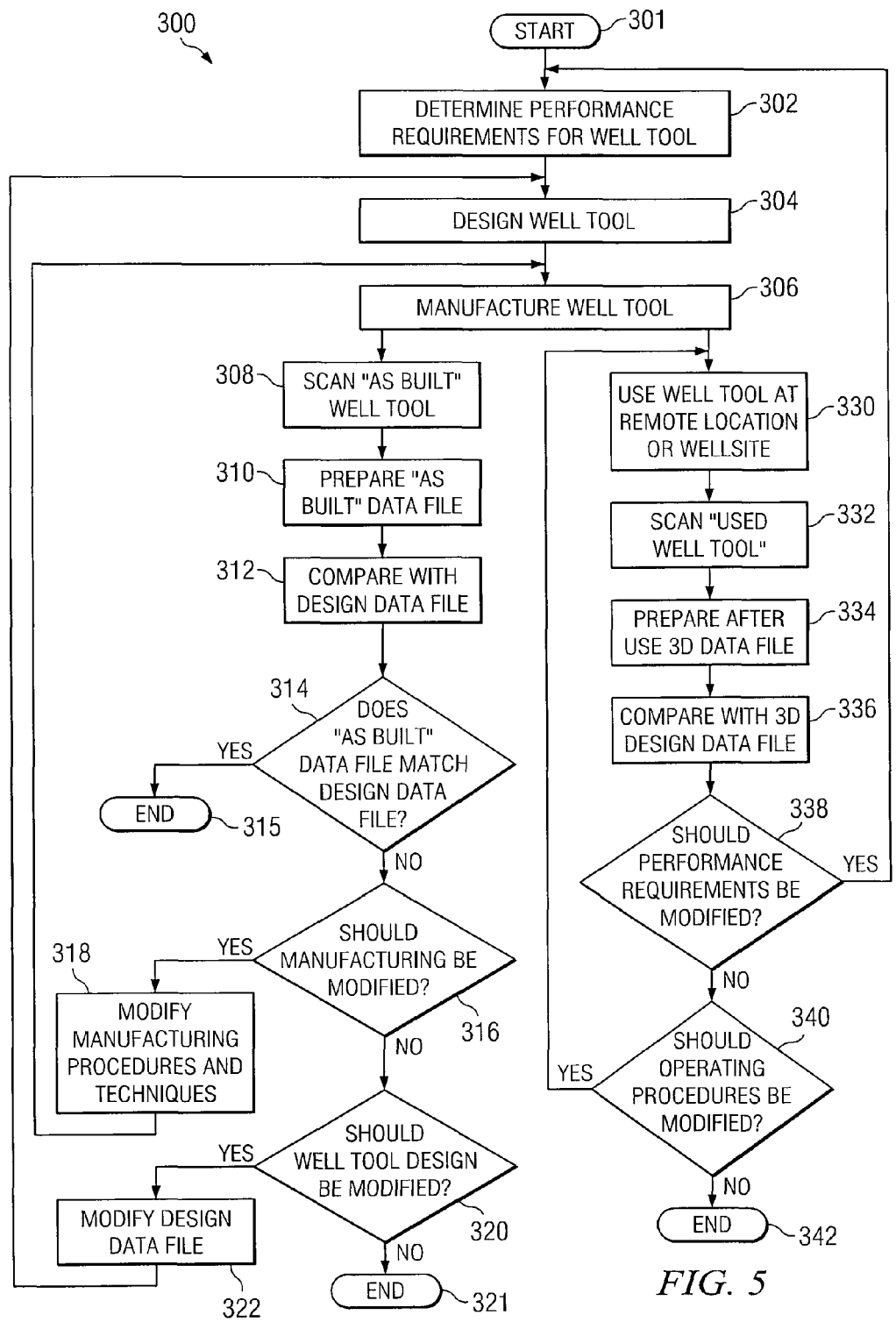
FIG. 5 is a block diagram showing various examples of feedback loops which may be used to improve the design, manufacture and/or use of a well tool in accordance with teachings of the present disclosure.

Various examples of methods and procedures which may be used to scan a well tool and improve design, manufacture, performance and/or use of the well tool in accordance with teachings of the present disclosure are shown in FIGS. 4 and 5. Method or process 200 incorporating teachings of the present disclosure may begin with an initial well tool design or an initial oilfield equipment design (hereinafter "initial design data file") at step 201 as shown in FIG. 4. Method or process 200 may generally be described as a plurality of feedback loops operable to improve design, manufacture, performance and/or use of a well tool.

For embodiments represented by method or process 200, step 201 may include obtaining an initial design data file associated with rotary drill bit 20. 3D design data files (if available) may also be obtained at step 201. Based on information contained in the initial design data file, various types of manufacturing equipment and tooling, including, but not limited to, molds may be fabricated or formed at step 202. At step 204, various types of manufacturing equipment, fixtures and/or machine tools may be scanned with 3D scanning system 100 to produce a corresponding three dimensional image in accordance with teachings of the present disclosure.

For example, three dimensional image 205 as shown in step 204 may be formed by scanning a corresponding mold with 3D scanning system 100. Three dimensional image 205 may be converted to a corresponding as built 3D data file. At step 210 the as built 3D data file may be compared with an initial design 3D data file for the mold. Based on the results of the comparison, the design for the associated mold may be modified or a new mold design may be prepared. Steps 202, 204, and 210 may be repeated until all manufacturing equipment, fixtures and/or machine tools including any required molds have been validated as being satisfactorily designed and manufactured for use in producing rotary drill bit 20.

At step 206, rotary drill bit 20 or other well tool may be manufactured based on an initial design data file including, but not limited to, a 3D design data file. At step 208, rotary drill bit 20 may be scanned using 3D scanning equipment 100. The resulting 3D image may be converted to an as built 3D data file. The as built 3D data file may be returned to or fed back to design step 210. At design step 210, the as built 3D data file may be compared with the initial design data file. Based on the results of the comparison, one or more design parameters associated with rotary drill bit 20 may be modified and/or one or more manufacturing procedures associated with rotary drill bit 20 may be modified. Steps 202, 204, 206, 208 and feedback loop or step 210 may be repeated as many times as required until as built rotary drill bit 20 satisfactorily corresponds with the initial design data file or the design data file as modified.

As previously noted, each manufacturing process and each piece of manufacturing equipment and/or tooling may also be evaluated and improved in accordance with teachings of the present disclosure. For example, at step 220 the as built 3D data file prepared at step 208 may be modified by removing all features associated with rotary drill bit 20 except for cutting elements 28. See for example, three dimensional images 222a and 222b of cutting elements 28 at step 220.

Each cutting element 28 disposed on exterior portions of respective blades 26 may then be evaluated with respect to various design parameters such as location, orientation, back rake angle, etc. For example, the thickness of brazing used to attach each cutting element 28 with adjacent portions of respective blade 26 may be evaluated and compared with an associated 3D design data file.

At step 230, various portions of the design data file represented by data sheets or data pages 232a, 232b and 232c may be used to evaluate the orientation and location of each cutting element 28. 3D images 234 and 236 are representative of additional information which may be provided by 3D scanning system 100 for use during the evaluations and comparisons at step 230. The results of such evaluation or comparison may be returned to step 210 for use in modifying the associated design data file and/or one or more manufacturing procedures associated with cutting elements 28.

Various design changes may be made to cutting structures of a rotary drill to improve or optimize downhole drilling performance of the rotary drill bit. One or more force balancing simulations may be conducted to improve the cutting structures of rotary drill bit 20 based on evaluations conducted at step 230 and/or other steps associated with method or process 200. One or more manufacturing processes may be altered if the as built 3D data file for cutting elements 28 or any other portion of rotary drill bit 20 does not satisfactorily correspond with an associated design data file. At any point in the process represented by feedback loop 200, a new design or modified design may be prepared and sent to step 202 to start a new evaluation process.

Manufacturing procedures and techniques may be modified at any point or step in the process represented by feedback loop 200. A mold may be scanned using 3D scanning system 100 and found to be under sized or over sized. The mold may be replaced or refurbished. One or more machine tools may be scanned using 3D scanning system 100 and found to be worn. The machine tools may be replaced or refurbished. Software applications and programming associated with such machine tools may also be evaluated.

Shrinkage in cast parts may be precisely quantified and evaluated using a 3D scanning system and various teachings of the present disclosure. An associated casting design may be altered to counter undesired or excess shrinkage. One or more material changes may also be made to avoid undesired shrinkage of a cast part.

Procedure or method 300, as shown in FIG. 5, represents another example of 3D scanning techniques and multiple feedback loops which may be used to improve design, manufacture, performance and/or use of well tools and oilfield equipment in accordance with teachings of the present disclosure. Method or process 300 may begin at step 301. At step 302, various performance requirements for a respective well tool may be determined. At step 304, an initial design data file may be prepared for the well tool. At step 306, the well tool may be manufactured based on the initial design data file. For some embodiments the initial design data file may be a 3D design data file.

For some applications, the recently manufactured well tool may be scanned at step 308 using 3D scanning equipment 100 prior to sending the well tool for use at a well site. The resulting 3D image may be used at step 310 to prepare an as built 3D data file. At step 312, the as built 3D data file may be compared with the initial design data file.

As step 314, the as built 3D data file may be compared with the design 3D data file. If the comparison is satisfactory, process 300 may terminate or the well tool may be used at a well site. See for example step 330. If the comparison at step 314 between the as built 3D data file and the initial design data file is not satisfactory, further evaluation may be conducted at steps 316 and 320.

At step 316, a decision may be made to consider modifying one or should one or more manufacturing procedures. Associated manufacturing equipment, fixtures and/or machine tools may also be modified. If the answer is yes, the manufacturing procedures and techniques including manufacturing equipment fixtures and/or machine tools may be modified at step 318 and another well tool manufactured at step 306.

At step 320, an evaluation may be done to determine if the design data file for the well tool should be modified. If the answer is no, method or process 300 may end at step 321 or the well tool may be used at a well site. See for example step 330. If the answer is yes, at step 322 the design data file for the well tool may be modified and the well tool design updated at step 304. Steps 304-320 may then be repeated.

For other applications a well tool may be used at a remote location or well site at step 330 after manufacture of the well tool. At step 332, the used well tool may be scanned using 3D scanning system 100 to create a 3D image of the used well tool. At step 334, an after use 3D data file of the well tool may be prepared. At step 336, a comparison may be done between the after use 3D data file and the associated design data file which may include a 3D design data file.

At step 338, an evaluation may be made to determine if performance requirements for the well tool should be modified based on the comparison in step 336. If the answer is yes, the performance requirements for the well tool may be modified and steps 302-338 repeated. If the answer is no, the process may go to step 340.

At step 340 an evaluation may be made to determine if operating procedures for the well tool should be modified based on the comparison in step 336. If the answer is yes, operating procedures for the well tool may be modified and steps 330-340 repeated for another recently manufactured well tool. Examples of modifications which may be made to operating procedures associated with a rotary drill bit based on the comparison in step 336 may include, but are not limited to, changing weight on bit (WOB), revolutions per minute (RPM) and/or fluid flow rate of drilling fluid supplied to the rotary drill bit. Various modifications may also be made to an associated directional drilling package or bottom hole assembly to improve performance of an associated rotary drill bit while forming a directional wellbore (not expressly shown). If the answer is no at step 340, the process may go to step 342 and end.

For some applications associated with rotary drill bits, comparison of an after use 3D data file with an associated design data file at step 336 may be used to perform one or more force balancing simulations of an associated cutting structure. The results from such force balancing simulations may be used to modify designs and/or manufacturing techniques associated with the cutting structure, cutting elements and/or other components of rotary drill bit 20.

One or more computational fluid dynamics (CFD) simulations may be conducted based on the results of the comparison at step 336. CFD simulations may provide velocity vectors corresponding with various portions of a well tool with high fluid flow rates. One evaluation may be to determine if exterior portions of a rotary drill with high fluid velocity correspond with areas of high abrasion, erosion and/or wear. Comparing an as built 3D data file design with an associated after use 3D data file and an associated 3D design data file may show areas of abrasion, erosion and/or wear with a high degree of precision and accuracy. Such evaluations and comparisons may result in changing the location and/or orientation of one or more nozzles 34 on rotary drill bit 20. The geometrical configuration and dimensions associated with blades 26 and/or junk slots 32 may also be changed. The design of associated cutting elements 28 and other cutting structures may also be modified to minimize abrasion, erosion and/or wear.

Method or process 200 as shown in FIG. 4 and method or process 300 as shown in FIG. 5 represent only a limited number of various methods, processes and feedback loops which may be used in accordance with teachings of the present disclosure to improve design, manufacture, performance and/or use of well tools. For example, procedures may be established to conduct a 3D scan of all well tools or a representative number of well tools prior to shipment to a customer or well site. Resulting as built 3D data files may be compared with an associated design data file. Such comparisons may be conducted on all data points associated with each 3D image or only on a selected number of data points for each 3D image. The frequency of conducting 3D scanning of well tools and/or the number of data points evaluated during comparison of as built 3D data files with associated design data files may be varied as appropriate to confirm that associated manufacturing procedures and techniques along with associated manufacturing equipment, fixtures and/or tooling are producing well tools within required design limitations and tolerances.

From time to time, 3D scanning of well tools after manufacture and after use at a well site may result in modifications to an associated design data file and/or associated manufacturing procedures and techniques to ensure that each well tool satisfies associated performance requirements. Manufacturing equipment, fixtures and/or machine tools may also periodically be scanned using 3D scanning equipment in accordance with teachings of the present disclosure to validate that such manufacturing equipment, fixtures and/or machine tools have not been damaged or are out of tolerance.

For some applications, a series of after use 3D data files may be use to create wear graphs (not expressly shown) for cutting elements 28 disposed on rotary drill bit 20 after drilling a well bore. Such wear graphs may show the effects of abrasion, erosion and/or wear on cutting elements 28. Wear graphs may also be created for gage cutter 30 and/or other portions of rotary drill bit 20 based on a series of after use 3D data files. Teachings of the present disclosure may be used to prepare accurate and very detailed graphs or records of abrasion, erosion and/or wear of cutting structures or other portions of a specific rotary drill bit or selected portions of any other well tool subject to abrasion, erosion and/or wear.

Although the present disclosure and its advantages have been described in detail, it should be understood that various changes, substitutions and alternations can be made herein without departing from the spirit and scope of the disclosure as defined by the following claims.

What is claimed is:

1. A method to improve design, manufacture, performance and/or use of a well tool comprising:
   scanning the well tool, after manufacture, with a three dimensional (3D) scanning system operable to create a 3D image of the well tool as manufactured;
   converting the 3D image of the manufactured well tool into an as built 3D data file;
   comparing the as built data 3D file with an associated 3D design data file for the well tool;
   evaluating variations between the associated 3D design data file and the as built 3D data file; and
   modifying at least one design parameter and at least one manufacturing procedure associated with the well tool based on at least one variation between the associated 3D design data file and the as built 3D data file.

2. The method of claim 1 further comprising:
   using the well tool at a well site;
   scanning the used well tool with a 3D scanning system operable to obtain a 3D image of the well tool after such use;
   converting the 3D image of the used well tool into an after use 3D data file;
   comparing the after use 3D data file with the associated 3D design data file for the well tool; and
   measuring and quantifying abrasion, erosion and/or wear of the used well tool.

3. The method of claim 2 further comprising modifying at least one design parameter in the associated 3D design data file based on the abrasion, erosion and/or wear of the well tool.

4. The method of claim 1 further comprising:
   conducting a computational flow data simulation associated with the well tool based on the as built 3D data file; and
   modifying at least one design parameter in the associated 3D design data file based on the computational flow data simulation.

5. The method of claim 1 further comprising:
   conducting a first computational flow data simulation associated with the well tool based on the associated 3D design data file;
   conducting a second computational flow data simulation based on the as built 3D data file; and
   evaluating variations between the first computational flow data simulation and the second computational flow data simulation.

6. The method of claim 5 further comprising modifying at least one design parameter in the associated 3D design data file based on variations between the first computational flow data simulation and the second computational flow data simulation.

7. The method of claim 1 wherein modifying the at least one manufacturing procedure further comprises modifying at least one mold associated with manufacturing the well tool based on the at least one variation between the associated 3D design data file and the as built 3D data file.

8. The method of claim 1 wherein modifying the at least one manufacturing procedure further comprises modifying tooling and/or fixtures associated with manufacturing the well tool based at least in part on the at least one variation between the associated 3D design data file and the as built 3D data file.

9. The method of claim 1 further comprising:
   conducting a first computational flow data simulation associated with the well tool based on the as built 3D data file; and
   modifying at least one manufacturing procedure associated with the well tool based on the first computational flow data simulation.

10. The method of claim 9 further comprising:
    conducting a second computational flow data simulation associated with the well tool based on the associated 3D design data file; and
    modifying at least one manufacturing procedure associated with differences between the first computational flow data simulation and the second computational flow data simulation.

11. The method of claim 1 wherein scanning the well tool further comprises scanning the well tool with a 3D white light scanning system.

12. The method of claim 1 further comprising:
    using the well tool at a well site;
    scanning the used well tool with a 3D scanning system to obtain a 3D image of the used well tool and converting the 3D image of the used well tool into an after use 3D data file;
    conducting a computational flow data simulation associated with the used well tool based on the after use 3D data file;
    measuring and quantifying abrasion, erosion and/or wear of the used well tool based on the computational flow data simulation; and
    modifying at least one manufacturing procedure associated with the well tool based on the abrasion, erosion and/or wear of the used well tool.

13. The method of claim 1 further comprising:
    scanning the well tool, after an initial manufacture of the well tool, with the 3D scanning system to create a 3D image of the well tool as initially manufactured;
    converting the 3D image of the initially manufactured well tool into an initial as built 3D data file;

comparing the initial as built 3D data file with an initial design 3D data file for the well tool;
evaluating variations between the initial design 3D data file and the initial as built 3D data file; and
modifying at least one design parameter of the initial designed 3D data file based on at least one variation between the initial design 3D data file and the initial as built 3D data file.

14. The method of claim 1 further comprising:
using the well tool at a well site;
scanning the used well tool with a 3D scanning system to obtain a 3D image of the used well tool after use at the well site;
converting the 3D image of the used well tool into a 3D after use data file;
comparing the 3D after use data file with the associated 3D design data file;
evaluating differences between the after use 3D data file and the associated 3D design data file; and
modifying at least operating parameter associated with the well tool based on at least variation between the after use 3D data file and the associated 3D design data file.

15. The method of claim 1 further comprising:
using the well tool at a well site;
scanning the used well tool with a 3D scanning system to obtain a 3D image of the used well tool after use at the well site;
converting the 3D image of the used well tool into a 3D after use data file;
comparing the 3D after use data file with the as built 3D data file;
evaluating differences between the after use 3D data file and the as built 3D data file; and
modifying at least operating parameter associated with the well tool based on at least variation between the after use 3D data file and the as built 3D data file.

16. The method of claim 1 further comprising:
using the well tool at a well site;
scanning the used well tool with a 3D scanning system to obtain a 3D image of the used well tool;
converting the 3D image of the used well tool into a 3D after use data file;
comparing the 3D after use data file with an associated prior to use 3D data file of the well tool;
evaluating differences between the after use 3D data file and the prior to use 3D data file; and
modifying at least one design parameter associated with the well tool based on at least one variation between the after use 3D data file and the prior to use 3D data file.

17. The method of claim 16 further comprising modifying at least one operating parameter associated with use of the well tool at the well site based on abrasion, erosion and/or wear of the well tool.

18. The method of claim 16 further comprising modifying at least one manufacturing procedure associated with manufacture of the well tool based on at least one variation between the after use 3D data file and the prior to use 3D data file.

19. The method of claim 16 wherein evaluating differences between the after use 3D data file and the prior to use 3D data file further comprises using an as built 3D data file as the prior to use 3D data file.

20. The method of claim 16 wherein evaluating differences between the after use 3D data file and the prior to use 3D data file further comprises using a 3D design data file as the prior to use 3D data file.

21. The method of claim 1 further comprising:
using the well tool to form at least one portion of a wellbore;
scanning the used well tool with a 3D scanning system operable to obtain a 3D image of the well tool after such use;
converting the 3D image of the used well tool into an after use 3D data file;
comparing the after use 3D data file with the as built data file for the well tool;
evaluating differences between the as built 3D data file and the after use 3D data file;
determining the amount of abrasion, erosion and/or wear of cutting structures associated with the used well tool based on the differences between the after use 3D data file and the as built 3D data file; and
converting the amount of abrasion, erosion and/or wear of the cutting structures into a corresponding IADC drill bit grade.

* * * * *